No. 807,286. PATENTED DEC. 12, 1905.
J. H. KING.
NON-SPILLABLE MILK PAIL.
APPLICATION FILED JUNE 26, 1905.
3 SHEETS—SHEET 1.
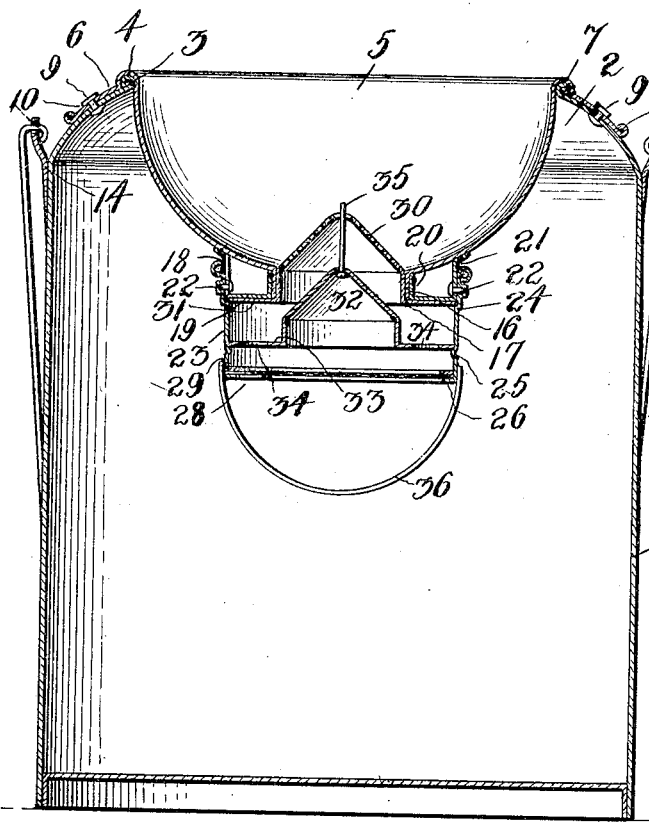
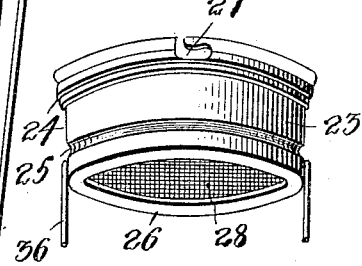
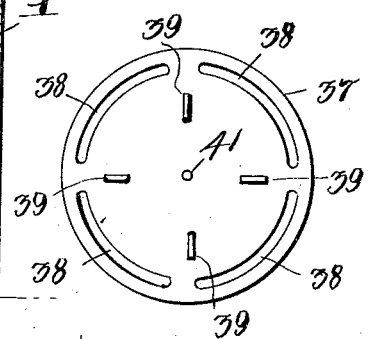
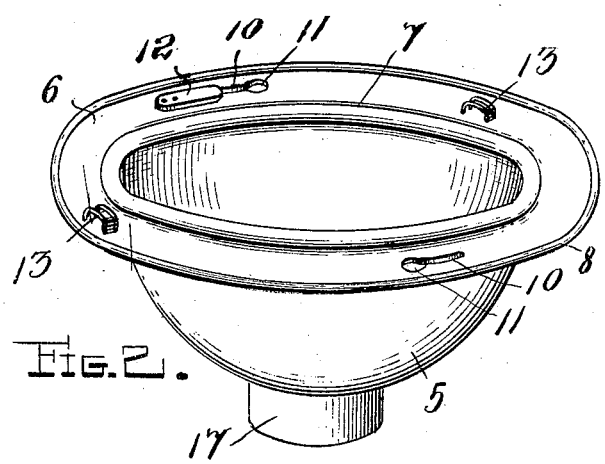
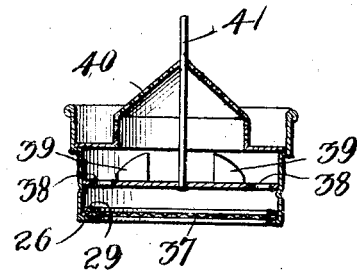
Witnesses
Jos. A. Koehl
C. H. Griesbauer
Inventor
John H. King.
by H. B. Willson
Attorney No. 807,286.  
PATENTED DEC. 12, 1905.  
J. H. KING.  
NON-SPILLABLE MILK PAIL.  
APPLICATION FILED JUNE 26, 1905.  
3 SHEETS—SHEET 2.
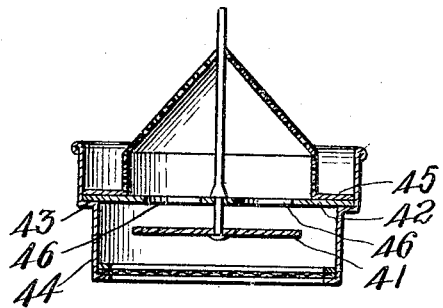
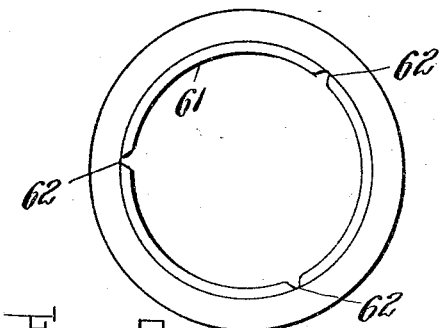
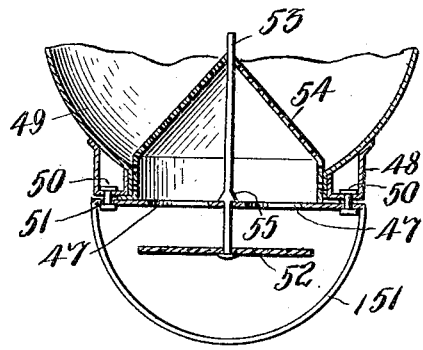
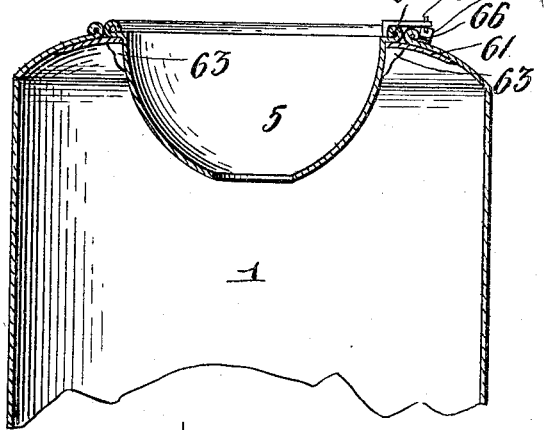
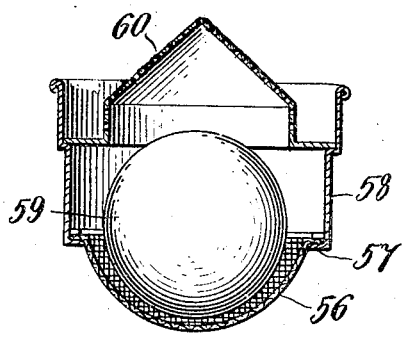
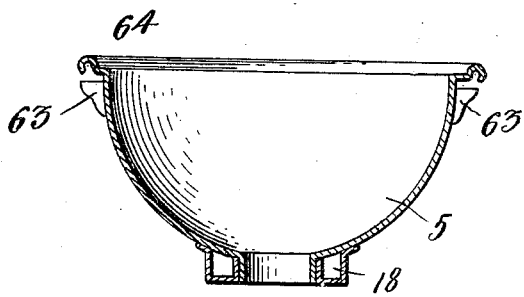
Witnesses  
Jas. A. Koehl.  
C. H. Griesbauer.
Inventor  
John H. King.  
by H. B. Willson  
Attorney No. 807,286. PATENTED DEC. 12, 1905.
J. H. KING.
NON-SPILLABLE MILK PAIL.
APPLICATION FILED JUNE 26, 1905.

3 SHEETS—SHEET 3.

Witnesses
Geo. Hilton.
C. H. Griesbauer.

Inventor
John H. King,
by H. B. Willson
Attorney

UNITED STATES PATENT OFFICE.

JOHN HEUSTIS KING, OF GARRITY, ALABAMA.

NON-SPILLABLE MILK-PAIL.

No. 807,286.  Specification of Letters Patent.  Patented Dec. 12, 1905.

Application filed June 26, 1905. Serial No. 267,090.

*To all whom it may concern:*

Be it known that I, JOHN HEUSTIS KING, a citizen of the United States, residing at Garrity, in the county of Mobile and State of Alabama, have invented certain new and useful Improvements in Non-Spillable Milk-Pails; and I do declare the following to be a full, clear, and exact description of the invention, such as will enable others skilled in the art to which it appertains to make and use the same.

My invention relates to improvements in non-spillable milk-pails; and it consists in the construction, combination, and arrangement of devices hereinafter described and claimed.

Figure 12:
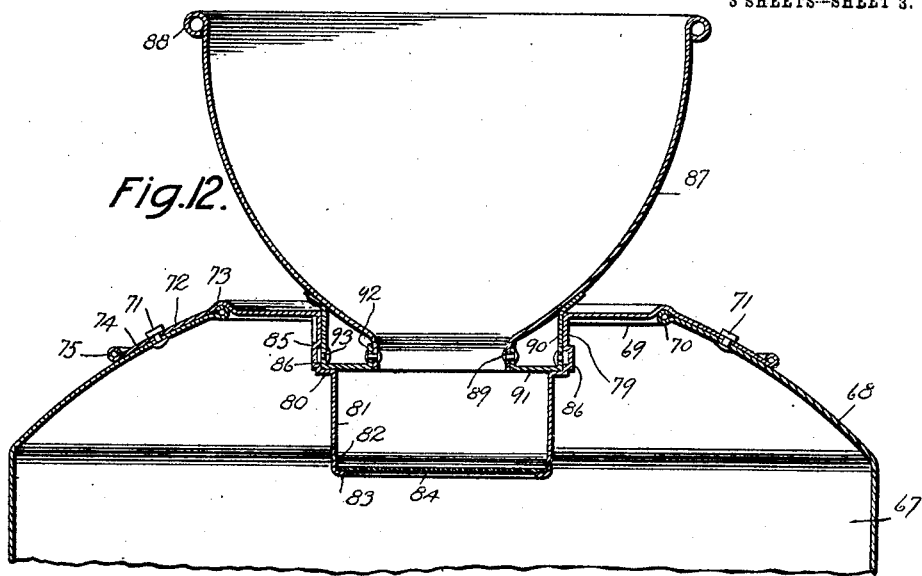
Figure 13:
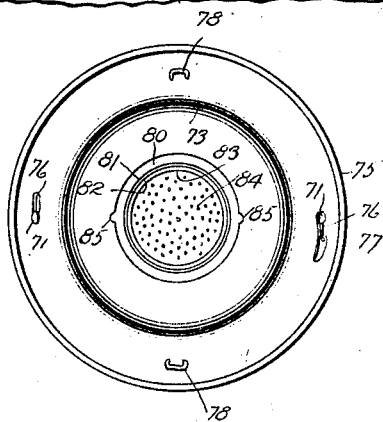
Figure 14:
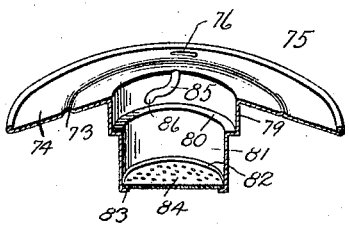

In the accompanying drawings, Figure 1 is a vertical central sectional view of a non-spillable milk-pail embodying my improvements. Fig. 2 is a detail perspective view of the receiving-bowl. Fig. 3 is a similar view of the cap. Fig. 4 is a top plan view of a modified form of the valve. Fig. 5 is a detail sectional view of the same, showing the same in position in the cap. Fig. 6 is a detail sectional view showing another form of valve. Fig. 7 is a similar view showing another modification. Fig. 8 is a similar view showing another modified construction of the valve. Fig. 9 is a detail sectional view showing a modification of the construction of the receiving-bowl and pail. Fig. 10 is a top plan view of the constuction shown in Fig. 9, and Fig. 11 is a detail sectional view of the receiving-bowl. Fig. 12 is a vertical central sectional view of another modified form of my invention in which the receiving-bowl is mounted on the pail. Fig. 13 is a top plan view of the cover, the receiving-bowl being removed. Fig. 14 is a sectional perspective view of the same.

Referring more particularly to the form of my invention shown in Figs. 1, 2, and 3, the pail 1, which may be of any suitable size and may be made of any suitable material, is formed with an arched top 2, having a central opening 3 and a reinforcing-bead 4 around said opening. A receiving-bowl 5 is adapted to be placed in the said opening so as to extend downwardly in the upper portion of the pail and is provided at its upper side with an annular outwardly-extending rim 6. The said rim is of concavo-convex form transversely, so that its under side is adapted to fit snugly on the upper side of the top 2 of the pail and is formed where it joins the body of the bowl with a bead 7, which projects upwardly therefrom and forms a groove in the under portion of the rim to receive and snugly fit on the bead 4 of the pail-top. The outer edge of the rim 6 is provided with a strengthening bead or roll 8. The pail-top 2 is provided with a pair of upwardly-extending locking-studs 9, which have heads of enlarged diameter and are located diametrically opposite each other. The rim 6 of the receiving-bowl is provided in opposite sides with curved slots 10 of a width to correspond with the diameter of the shanks of said locking-studs, each of the said slots terminating at one end in an opening 11 of a diameter sufficient to enable it to clear the enlarged heads of the locking-studs. It will be understood that by placing the receiving-bowl in the opening 3 of the pail cover or top and so manipulating the same as to cause the heads of the locking-studs to pass through the openings 11 and by then partially turning said receiving-bowl so as to cause the shanks of said studs to enter the slots 10 the receiving-bowl may be firmly locked to the pail-top and yet so that it can be readily detached therefrom.

To prevent casual detachment of the receiving-bowl, a spring-latch 12 is secured at one end on the upper side of the rim of the receiving-bowl and adapted to engage the enlarged head of one of the locking-studs by means of an opening in the end of the spring-latch 12. To enable the receiving-bowl to be readily placed on and removed from the top of the bowl, I provide the rim of said bowl with handles 13, which are on the upper side of the said rim. The pail is provided with the usual ears 14 and bail 15.

In the bottom of the receiving-bowl is an opening or port 16, and the said bowl is formed with a depending flange 17, which surrounds said opening. Around the said flange is a collar 18, which comprises an annular horizontal portion 19, the inner upwardly-extending flange 20, which bears against and is secured to the flange 17, and an outer upwardly-extending flange 21, which bears against and is secured to the bottom of the bowl. Said flange 21 is provided with outwardly-projecting locking-studs 22, which are here shown as oppositely disposed. Said collar greatly strengthens the construction of the receiving-bowl and in connection with the studs 22 provides means for attaching a cap 23 to said bowl and for detaching said cap therefrom. The said cap, which is open at its upper and lower sides, is formed with an annular shoulder 24 at a suitable distance from its upper side, an inset bead 25 at a suitable distance from its lower side, and at its extreme lower end with an inturned flange 26. In the sides of the said cap are stamped upwardly-opening bayonet-slots 27, which coact with the studs 22 of the collar 18 to detachably lock said cap to the bottom of the receiving-bowl. A strainer 28 is placed on the flange 26 and secured thereon by a ring 29. A strainer-cone 30 projects upwardly through the opening in the bottom of the receiving-bowl and is formed with an outwardly-extending base-flange 31, which bears on the shoulder 24 of the cap 23 and against the under side of the collar 18, so that it is held between said shoulder and said collar. A conical valve 32 operates in the collar between the strainer-cone and the inset bead 25 of the collar. Said conical valve is formed with an outwardly-extending annular base-flange 33, which is provided with openings 34. At the apex of the conical valve is an upwardly-extending rod 35, which extends and operates in an opening in the apex of the conical strainer and serves to guide the conical valve in its vertical movement, as will be understood.

Ordinarily the valve will remain in its lowered position (shown in Fig. 1) to leave the openings 34 uncovered and permit of the passage of milk from the bowl through the conical strainer, said openings in the valve, and the strainer 28. In the event that the pail should be overturned the conical valve would be forced outwardly by the internal pressure of the contents of the pail to cause said valve to close its flange 33 against the flange 31 of the conical strainer, and thereby close the openings 34 and prevent the spilling of the milk. I here show the cap 23 provided with a handle 36, which depends therefrom.

In Figs. 4 and 5 I illustrate a modified construction of the valve. The latter comprises a circular plate 37, provided near its periphery with curved quadrant openings 38 and provided on its upper side with vertically-disposed guide-wings 39, which are adapted to enter the base of the conical strainer 40 when the valve is in closed position. A guide-rod 41 extends upwardly from the center of the said plate 37 and operates in the opening in the apex of the conical strainer.

In Fig. 6 I show another modified construction, in which the valve 41 is a circular imperforate plate and is employed in connection with a plate 42, which is secured between the shoulders 43 of the cap 44 and the base-flange 45 of the strainer-cone. The said plate 42 is provided with openings 46 above the valve for the passage of the milk therethrough, and when the valve is closed it bears against the under side of the said plate and closes said openings. The valve has an upwardly-extending guide-rod 53, which operates in openings in the center of the plate 42 and in the apex of the conical strainer 54 and is provided with a diametrical enlargement 55, which forms the stop that coacts with the said plate 52 to limit the descent of the valve.

In Fig. 7 I show another modified construction, in which the plate 47 bears directly against the under side of the base-flange of the conical strainer and is secured detachably thereto and to the bottom of the cover 48 of the bowl 49 by means of depending headed locking-studs 50, which coact with locking-slots 51, with which the said plate 47 is provided. The valve shown in this connection is identical in construction with the form of valve shown in Fig. 6. A handle 151 depends from and is secured to the said plate 47.

In Fig. 8 I show another modified construction, in which I provide a substantially semispherical strainer 56, which is supported by the flange 57 of a cap 58, and also provide a spherical valve 59, which is adapted when raised to close the space under the conical strainer 60.

In Fig. 9 I show a modified construction of the upper portion of the pail and of the receiving-bowl, in which I provide an annular locking-flange 61, which is secured to the under side of the top of the pail, projects partly into the opening therein, and is provided with radially-disposed notches 62. The bowl is provided on its outer side with lugs 63, which are so located as to pass through the said notches 62 when the bowl is placed on the pail-top. The bowl is formed at its upper edge with an outwardly-extending flange 64 to bear on the ring or flange 61 to support the bowl, and the latter being turned so as to cause its lug 63 to be out of register with the notches 62 said lugs are caused to bear against the under side of the flange or ring 61 and to lock the bowl thereto against casual detachment. A pin 65 is secured to and extends horizontally outwardly from one side of the flange or bead 64 of the bowl to bear on the bead or flange 66, which surrounds the opening in the top of the pail and under which the ring or flange 61 is secured. A spring-latch 161, which is secured on the upper side of the pail, engages the pin 65 and coacts therewith to secure the bowl in place.

In Figs. 12, 13, and 14 I show another modification, in which the receiving-bowl is mounted on the pail. The pail 67 is provided at its upper end with an arched inturned flange 68, which forms a partial cover therefor, and an opening 69. A strengthening-bead 70 extends around the opening. Said flange also has headed locking-studs 71, which project from its upper side and are disposed diametrically opposite each other. A cover 72 is adapted to be placed on the arched flange to coact therewith to form a cover for the pail and is formed with an annular groove 73 to receive the bead 70 and with an outwardly-extending rim 74 to bear on the flange 68 and having a strengthening-bead 75. The cover has locking-slots 76 to coact with the studs 71 and a spring-latch 77 to detachably lock the cover in place. It is also provided with handles 78. At the center of the cover is an opening and a depending flange 79, formed with an inwardly-extending annular shoulder 80 and a lower portion 81 of slightly less diameter, having an inset bead 82 and provided at its lower edge with an inturned flange 83. A strainer 84 rests on this flange and is firmly secured thereto. In the sides of the flange 79 are bayonet-grooves 85, at the lower ends of which are locking pockets or recesses 86. In this form of my invention the receiving-bowl 87 is mounted on the pail and projects above the cover thereof. Said bowl has a reinforcing-bead 88 around the upper edge and is formed with a central opening at its bottom, around which is a depending flange 89. A collar 90, of a size which adapts it to fit in the flange 79 and to rest on the shoulder 80, is secured on the bottom of the receiving-bowl and has an inturned horizontal lower portion 81 and an upwardly-extending inner flange 82, which bears against and is secured to the flange 89 of the receiving-bowl. Said collar is provided with outwardly-projecting locking-studs 91, which coact with the bayonet-grooves 85 to detachably secure the receiving-bowl to the cover. A valve of any suitable form, together with the conical strainer, as shown in the other figures of the drawings and specifically described herein, may be employed in the contracted lower portion 81 of the flange 79.

Having thus described my invention, what I claim as new, and desire to secure by Letters Patent, is—

1. A pail or similar vessel having a top provided with an opening and a raised bead surrounding said opening, and a bowl to fit in said opening and having an outwardly-extending flange to bear on the vessel-top, said flange provided with a groove on its under side to receive the said bead, substantially as described.

2. A pail or similar vessel having a top provided with an opening and a raised bead surrounding said opening, and a bowl to fit in said opening and having an outwardly-extending flange provided with a groove on its under side to receive the said bead, said bowl and said vessel having coacting means to detachably secure the bowl to the top of the vessel, substantially as described.

3. A pail or similar vessel having a top provided with an opening and a raised bead extending around said opening, a receiving-bowl, and a supporting-flange for the said bowl, to bear on the top, and provided on its under side with a groove to receive said bead.

In testimony whereof I have hereunto set my hand in presence of two subscribing witnesses.

JOHN HEUSTIS KING.

Witnesses:
GEORGE JOSEPH HOOKS,
WM. J. McQUILLEN.